Aug. 31, 1965  E. G. BAILEY  3,203,685
BLAST FURNACE

Original Filed Oct. 10, 1960  2 Sheets—Sheet 1

United States Patent Office 3,203,685
Patented Aug. 31, 1965

3,203,685
BLAST FURNACE
Ervin G. Bailey, Bethlehem Township, Northampton County, Pa., assignor to Bailey Inventions, Inc., Bethlehem Township, Northampton County, Pa., a corporation of Pennsylvania
Original application Oct. 10, 1960, Ser. No. 61,633. Divided and this application Feb. 13, 1962, Ser. No. 173,038
5 Claims. (Cl. 266—30)

This invention relates to apparatus useful in the reduction of iron ore in accordance with one of the methods described in my copending patent application Serial No. 61,633, filed October 10, 1960, of which this application is a division.

Apparatus of this invention operates upon the principle of converting a vertically descending bed of solid organic fuel in such configuration and in such manner as to produce clean carbon monoxide gas which emerges from a surface of the fuel bed, other than the fuel replenishing surface thereof, directly into the lower portion of a blast furnace charge of iron ore and fluxing agents. To this end, the apparatus of this invention provides for the support of one side of a descending fuel bed by a gas pervious vertically extending refractory retaining wall. The opposite side of the fuel bed constitutes the off-gas surface and is defined, supported, and retained in substantially vertical position in juxtaposition with an adjacent vertically descending ore charge having a generally horizontally extending top off-gas surface directly beneath a stack. For this purpose, the furnace has a generally vertically extending wall in opposition to the pervious fuel bed retaining wall, between which two walls the juxtaposed organic fuel and ore charge beds are retained, though the fuel bed retaining wall may be, and preferably is, of less height than the opposed wall. Separate overhead feed mechanisms are provided, one adjacent the pervious wall for feeding organic fuel onto the top surface of the descending fuel bed and another adjacent the opposed wall for feeding the ore charge onto the top-off gas surface of the descending ore charge. The feed mechanisms, intermittent or continuous, are so controlled that the interface between the fuel bed and ore charge can be substantially parallel to the pervious refractory wall, whereby a fuel bed of substantially constant and predetermined thickness is continuously maintained. The apparatus includes means for feeding gas, such as air, oxygen, or oxygen-enriched air, through the pervious wall at suitable temperature and through the descending bed of fuel directly into the adjacent descending ore charge, and the volume of the gas and the thickness of the fuel bed are controlled to cause only incomplete oxidation of carbon in the solid fuel to carbon monoxide.

Because the off-gas surface of the fuel bed is covered by the juxtaposed descending ore charge, such off-gas interface as well as the interior of the bed, along most of its height, may be maintained at a temperature exceeding the liquid flowing point of the non-combustibles contained in the solid fuel and hence these non-combustibles, which at such temperatures are either themselves molten or part of a flowable eutectic, tend to drain downwardly through the fuel bed in liquid form and are thus gravity separated from the gaseous stream flowing transversely through the descending bed. This descending flow also acts in the manner of a gas washer to minimize unburned fuel particles proceeding with the gaseous reaction products produced in the fuel bed into the ore charge.

In some cases, supplemental heat input may be provided to the ore charge from electrodes or from other strategically disposed subsidiary or supplemental solid fuel feeds. In other cases, steam may be introduced with the combustion-supporting gas to limit the upper temperature developed in the fuel bed.

Great advantages accrue from using as the sustaining vertically descending charge ore which is not intermixed with solid carbon fuel such as the coke used in the present blast furnace operation; for the fuel bed operation is controlled to insure that sufficient carbon monoxide gas emerges from the fuel bed to reduce the ore contained in the retaining bed without the necessary generation of further carbon monoxide gas within the ore charge from non-ore sources. The entire solid fuel requirement for performing the iron ore reduction originates within the fuel bed outside of the ore charge.

Absence of fuel carbon in the reducing zone of the ore avoids the less predictable complicated endothermic reactions which take place in normal blast furnace operation. It tends to avoid loss of reducing gas which is not put to effective reactive use before escape. It makes possible operation with a much more nearly complete combustion within the ore charge of the carbon monoxide to carbon dioxide with the oxygen obtained from the reduction of $2Fe_2O_3$ to $4Fe+3O_2$ before the gaseous flow reaches the off-gas surface of the ore charge.

In some cases provision is made to feed some fuel with the ore in order to supply sufficient additional heat to maintain the heat balance or to supply further carbon for generation of carbon monoxide in the reducing zones, depending upon whether the values in the clean heat-laden carbon monoxide off-gases can be recovered in useful further reactions or heat transfer.

These and other objects of the invention will be more readily understood when taken in connection with the description of the accompanying drawings wherein.

Figure 1:
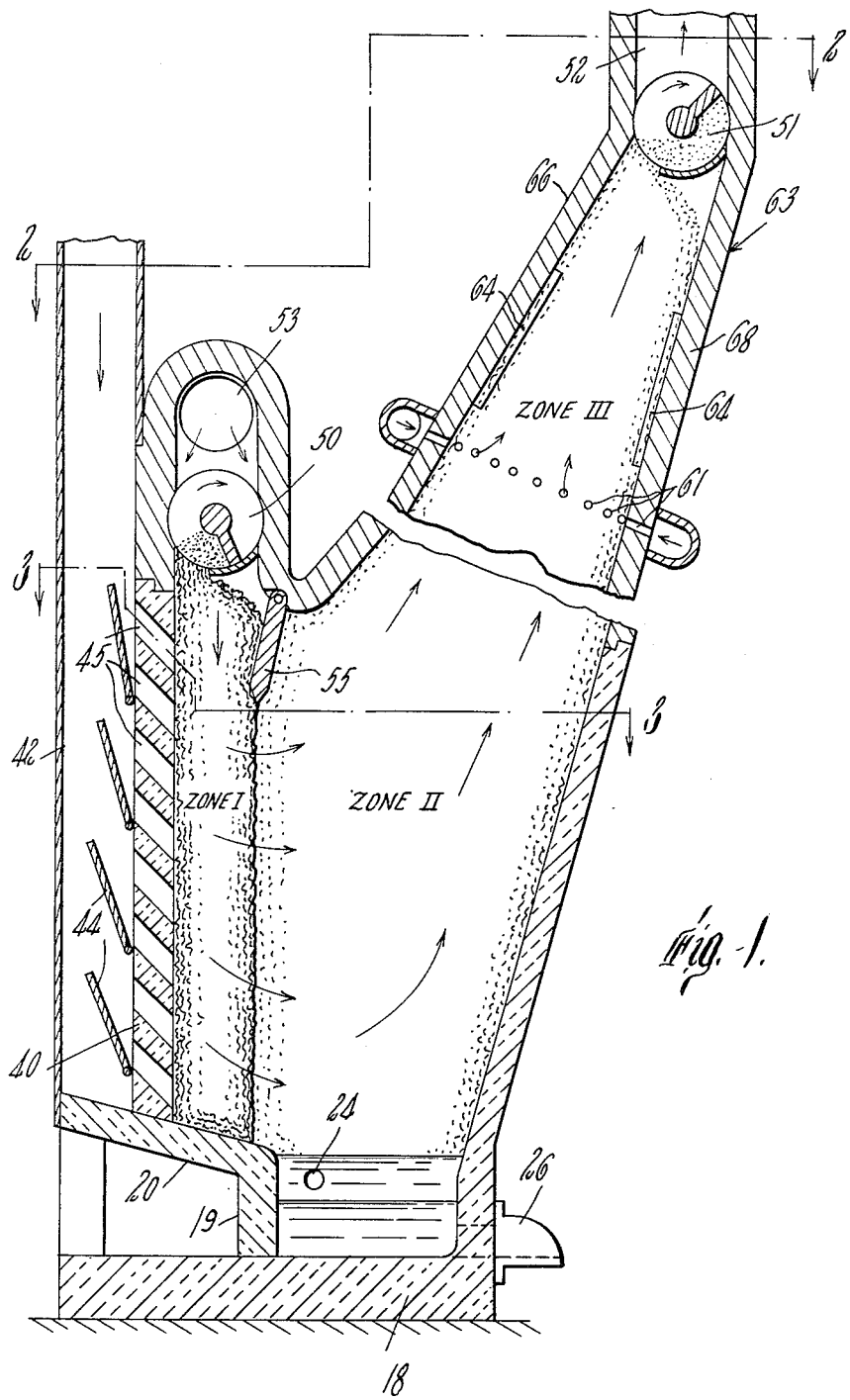
FIG. 1 is a vertical cross section through an iron reduction furnace designed for operation in accordance with this invention, being broken away to indicate extent.
Figure 2:
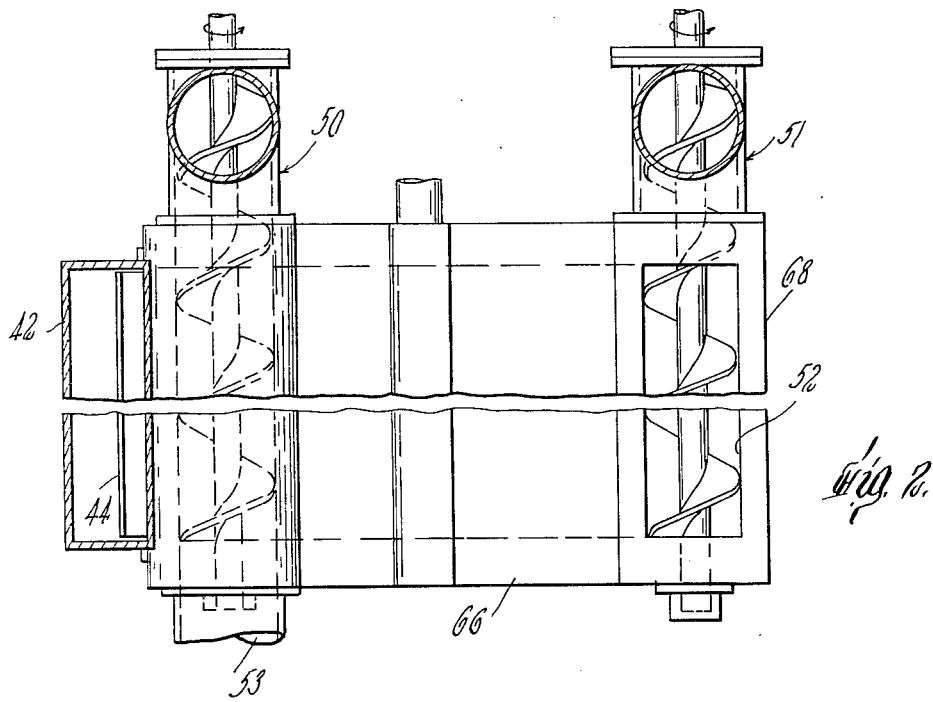
FIG. 2 is a plan view, partly in cross section, also broken away to indicate extent, of the furnace taken along line 2—2 of FIG. 1.
Figure 3:
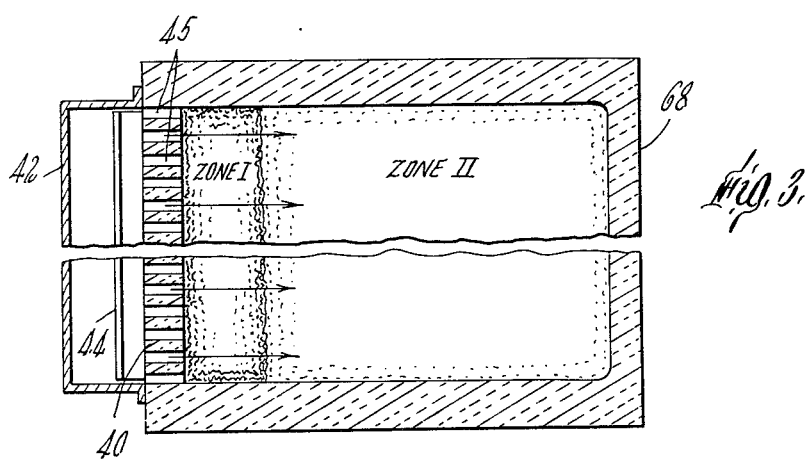
FIG. 3 is a cross-sectional view taken along the line 3—3 of FIG. 1.

FIG. 1 shows a furnace comprising a refractory hearth 18. An upstanding refractory wall 19 merges into an inclined imperforate refractory supporting surface 20. The back of the apparatus includes a further upstanding refractory wall 40 communicating with a plenum chamber 42 which is connected to a source of combustion-supporting gas such as preheated air, oxygen-enriched air, or oxygen, supplemented if desired by a steam inlet or a gas fuel inlet. A series of adjustable baffles 44 aid in directing the combustion-supporting gases into uniform, or otherwise distributed, flow along the height of the wall through spaced apertures 45, provided by spacing refractory bricks.

Arranged over the furnace chamber are two feeds 50 and 51, one for fuel and one for the ore charge, each provided with a conventional screw feed mechanism for distributing the material in a continuous manner across the width of the furnace. The first feed 50 is located over the rear portion of the furnace and the second feed 51 is at the top of a casing 63 having downwardly diverging walls 66 and 68.

Above the feed 51 is a stack 52 for the off-gases.

A supplemental combustion-supporting gas inlet 53 is positioned above the fuel feed 50 and an adjustable pivoted gate 55 is provided just below the fuel feed 50 in order to control the thickness of the fuel bed. The gate 55 will have to be water-cooled (not shown), and it should be understood that water-cooled screen tubes or other water-cooled structure may be utilized in partial or entire replacement of the refractory walls, as needed.

The apparatus may also contain electrodes 64 along the upper portion of the walls 66 and 68 and supplemental air inlets 61 for introduction of air or gaseous fuel if required.

In operation, any free-burning solid fuel may be fed at the feed 50 while essentially ore and proper proportions of limestone and dolomite, or the calcined products thereof, may be fed at the other feed 51. By properly controlling the two feeds, an interface is maintained by the juxtaposition of the beds of different content, thus maintaining an organic fuel bed of substantially uniform thickness and comprising a Zone I of sufficient thickness to prevent complete combustion of the carbon with the result that the gases emerging at the interface into Zone II are substantially entirely carbon monoxide or $CO+H_2$ in case steam is used for limiting the temperature of the fuel bed.

The result is that hot gases, i.e., above 1500° F., and preferably above 2700°–2732° F., proceed across the interface into reduction Zone II in such volume as to reduce the ore with conversion of the carbon monoxide into carbon dioxide.

The reduction zone is very simple with only the ore, stone, and slag flowing downwardly from Zone III, where the charge is fully preheated by the rising areas which, by heat exchange to the incoming ore charge, are cooled to less than 300° F., and in Zone II the counterflow of hot gas, rich in carbon monoxide and possibly $H_2$ completes the reduction of the FeO to Fe. The gas continues its upward flow as in the standard blast furnace where the remaining carbon monoxide and $H_2$ reduce the $Fe_2O_3$ and $Fe_3O_4$ to FeO, and these reactions cease only when the reducing gases attain their equilibrium pressure. All of the oxygen comes from the ore, and its combination with CO and $H_2$ supplies the greater part of the heat that is necessary to support the reducing reactions.

There need be much less CO or $H_2$ escape unburned as is inevitable with the standard blast furnace where the fuel is fed in with the ore charge at the top of the furnace, and much is wasted from the loss of CO and $H_2$ produced in a zone where they cannot possibly be used before escape.

The rate at which the ore charge is supplied in the present process is proportioned to the supply of reducing gases, CO and $H_2$, as indicated by gas temperatures and gas analyses at the proper points.

When using solid fuel with air as the oxidant, either the fuel or the air, or both, may be preheated. Air at 280° F. will burn some carbon to $CO_2$ to provide the required temperature in Zone I. The air can be preheated to 1300° F. or higher, as cost permits.

The ore charge must be adequately heated and calcined before entering the final stage of the reducing zone, as there is a close balance between the heat required for reduction and that made available from the combustion of CO and $H_2$, using the oxygen released from the ore charge by the reduction.

If the sensible heat in the gas leaving the reduction zone is not sufficient to fully heat the ore charge, the extra heat may be supplied electrically through electrodes 64 or by using a surplus of fuel in Zone I, in proportion to the ore being reduced, and burning this excess carbon monoxide with air injected at the proper place, as at 61 in Zone III. Alternately, this heat may be supplied by adding another fuel, for example $CH_4$, together with the required air at 61. Some solid fuel may be added with the ore charge and burned with air supplied at 61. When there is a surplus of heat as sensible heat of the off-gases, it may be used for preheating air, fuel or for other economic purposes.

Molten slag and molten iron collect at the bottom of the furnace and may be tapped at 24 and 26, respectively.

High ratios of $CO/CO+CO_2$ by volume and temperatures above 2200° F. can be readily maintained near the bottom of the ore charge, as is necessary to accomplish the FeO to Fe reduction. For example, the $CO/CO+CO_2$ ratio by volume should be about 75% at 2200° F. and 80% at 2700° F., or of the order of 72% on a weight or pound-mol basis.

However, the reduction of $Fe_2O_3$ and $Fe_3O_4$ to FeO takes place at much lower carbon monoxide contents (as little as 20% carbon monoxide in the presence of 10% $H_2O$ and at temperatures as low as 1200° F.). Thus in the upper part of the furnace, the lower carbon monoxide, lower temperature reduction can take place.

Some natural gas containing $CH_4$ as a principal constituent may also be introduced as part of the gas flowing through the perforate rear wall 40.

For an example of operation in the furnace of this invention, reference is made to the figures, including heat balances, given in my copending application, Serial No. 61,633 filed October 10, 1960, but which are not required for an understanding of the apparatus aspect of the invention herein claimed.

Arrows utilized in the drawings relate only to the flow direction of gases, as distinguished from fuels and liquids. Fuels used may be anthracite, coke, charcoal, dry wood, or any free-burning fuel.

Although a specific embodiment of apparatus of the invention has been described herein, it is not intended to limit the invention solely thereto, but to include all of the obvious variations and modifications within the spirit and scope of the appended claims.

What is claimed is:

1. A blast furnace having walls forming a closed chamber, including a pair of opposed generally vertically extending walls merging at their tops into a furnace stack, one of said walls having a lower gas pervious section and an upper solid section extending upwardly in laterally off-set relation with respect to said lower section, first overhead feed means between said lower section and said upper section for feeding solid fuel into said chamber to form a burning descending solid fuel bed supported on its rear side by said pervious wall section, second overhead feed means disposed adjacent said other wall underneath said stack for feeding material, including ore, into said chamber in a descending bed having one side of its upper portion supported by said upper solid wall section and having its bottom portion on said side in juxtaposed relation to and supporting and retaining at least a portion of the front side of said burning fuel bed, and means for conducting a blast of oxygen-containing gas through said pervious wall into the rear side of said fuel bed to drive hot gaseous reaction products of said fuel into said retaining bed for reaction with said ore and for ascending passage through the upper portion of said ore bed and through said second feed means into said stack.

2. Apparatus as claimed in claim 1 having means at the bottom of said furnace for collecting materials liquefied in both of said beds during operation of said furnace.

3. Apparatus as claimed in claim 1 having air inlets extending through the vertically extending walls of said closed chamber at a level above said first overhead feed means for directing oxygen-containing gas supplied to said air inlets directly into the sides of said retaining bed without passing through said fuel bed.

4. Apparatus as claimed in claim 1 having gate means for maintaining the contacting interface between the materials fed from said separate feed means in a generally vertical substantially constant fixed plane substantially parallel to said lower pervious wall section and means for moving said gate means into a plurality of different horizontally spaced positions to vary the thickness of said fuel bed by varying the horizontal distance of said interface from said lower pervious wall section.

5. Apparatus as claimed in claim 1 having means for conducting gas down into the top of said fuel bed to aid in driving all said gaseous reaction products of said fuel into said retaining bed.

(References on following page)

References Cited by the Examiner

UNITED STATES PATENTS

| | | | |
|---|---|---|---|
| 900,291 | 10/08 | Meissner | 266—25 |
| 1,334,310 | 3/20 | Mace | 266—25 |
| 1,507,740 | 9/24 | Kirby | 75—41 |
| 1,877,123 | 9/32 | Bunce | 75—86 X |
| 1,895,284 | 1/33 | Hay. | |
| 1,984,747 | 12/34 | Klencke | 75—89 |
| 2,143,905 | 1/39 | Ahlmann | 266—21 |
| 2,307,459 | 1/43 | Greenwalt | 75—40 |
| 2,345,067 | 3/44 | Osann | 266—20 X |
| 2,846,301 | 8/58 | Greenwalt | 75—40 |
| 2,846,302 | 8/58 | Greenwalt | 75—40 |

OTHER REFERENCES

Iron and Steel, 3rd edition, pages 161–162. Edited by Tieman, published in 1933 by McGraw-Hill Book Co., New York.

JOHN F. CAMPBELL, *Primary Examiner*.

DAVID L. RECK, MORRIS O. WOLK, *Examiners*.